US006674280B1

(12) United States Patent
Goetz et al.

(10) Patent No.: US 6,674,280 B1
(45) Date of Patent: Jan. 6, 2004

(54) POSITION DETECTION APPARATUS WITH DISTRIBUTED BRIDGE SENSOR

(75) Inventors: Jay R. Goetz, Hennepin, MN (US); Edgar R. Mallison, Hennepin, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/475,755

(22) Filed: Dec. 31, 1999

(51) Int. Cl.[7] .................................................. G01B 7/14
(52) U.S. Cl. ........................ 324/207.21; 324/207.12; 324/207.24
(58) Field of Search .................. 324/207.21, 207.22, 324/207.2, 207.24, 207.25, 173, 174, 252, 207.12; 338/32 H, 32 R

(56) References Cited

U.S. PATENT DOCUMENTS

| 4,492,922 A | * | 1/1985 | Ohkubo ................. 324/207.21 |
| 5,430,374 A | * | 7/1995 | Metz ..................... 324/207.21 |
| 5,574,365 A | * | 11/1996 | Oyama et al. ........... 324/207.21 |
| 5,680,042 A | * | 10/1997 | Griffen et al. .......... 324/207.21 |
| 6,160,395 A | * | 12/2000 | Goetz et al. ............ 324/207.21 |
| 6,300,758 B1 | * | 10/2001 | Griffen et al. .......... 324/207.12 |

FOREIGN PATENT DOCUMENTS

| DE | 198 00 805 A1 | 7/1999 |
| EP | 0 325 787 A2 | 8/1989 |
| EP | 0 427 882 A1 | 5/1991 |
| WO | WO 99 53266 A1 | 10/1999 |

* cited by examiner

Primary Examiner—Jay Patidar
(74) Attorney, Agent, or Firm—Matthew Luxton; Brain N. Tufte

(57) ABSTRACT

A position determining apparatus including a magnet that is attached to a movable member which moves along a defined path of finite length. An array of distributed bridge sensors are located adjacent to the predefined path. The distributed bridge sensors each have one or more magneto-resistive elements positioned at a first location along the defined path of the magnet, and one or more other magneto-resistive elements positioned at a second location along the defined path. The magneto-resistive elements at the first location experience a different magnetic field component than those at the second location. The distributed bridge sensors produce an increased linear range relative to non-distributed bridge sensors of the prior art.

45 Claims, 11 Drawing Sheets

POSITION DETECTION APPARATUS WITH DISTRIBUTED BRIDGE SENSOR

CROSS-REFERENCE TO RELATED CO-PENDING APPLICATIONS

This Application is related to U.S. patent application Ser. No. 09/059,798, filed Apr. 14, 1998, entitled "POSITION DETECTION APPARATUS WITH CORRECTION FOR NON-LINEAR SENSOR REGIONS", which is incorporated herein by reference.

BACKGROUND OF THE INVENTION

The present invention generally relates to position detection apparatus, and more particularly to apparatus for determining the position of a member that is movable along a defined path of finite length.

It is often desirably to identify the position of a device that is controlled by an actuator or the like. For example, in the controls industry, devices such as valves having valve stems or valve shafts that are movable by an actuator are used to control the flow of liquids and gases associated with industrial processes of various types. In these applications, it is often desirable to identify, at any given time, the precise position of the movable valve stem or valve shaft. This information allows improved understanding and control of the process.

A number of prior solutions have been proposed. Optical coding schemes make use of a coded element with opaque and transparent sections to provide digital data inputs to an array of sensors positioned to measure the light passing through the sections. While optical coding devices do not require a mechanical linkage, the optical approach only works well in very clean environments and is therefore not applied in many industrial environments.

Linear variable differential transformers (lvdt) can provide very accurate position information, but typically require a mechanical linkage and also generally use relatively high power. Potentiometers or other rotary transducers often require a mechanical linkage and also have the disadvantage of a sliding electrical contact that can cause long-term reliability issues. Hall effect transducers, as they are currently used, generally require a mechanical linkage.

An improved approach for determining the position of a movable member is disclosed in U.S. Pat. No. 4,698,996 to Kreft et al. Kreft et al. suggest providing a bar magnet on the movable member, which then moves parallel to a plurality of spaced sensors. During a calibration procedure, the bar magnet is moved step-by-step in a direction parallel to the line of sensors in precisely defined length units. When an output voltage of a particular sensor is zero, and neighboring sensors on either side thereof have respective positive and negative values, a length value is assigned to the particular sensor and stored.

For unknown positions of the magnet, the voltage values of neighboring sensors that are influenced by the magnet are measured and the relationships thereof are determined. Adjacent sensors that have voltage values that are of different polarity are selected. For voltage relationships that correspond exactly to a calibrated voltage relationship, the corresponding calibrated positional value is assigned to the unknown position. For voltage relationships lying between the calibration values, suitable interpolation methods are used to define the position of the magnet.

A limitation of Kreft et al. and others is that the spacing between neighboring sensors must typically be relatively small. This is because the range over which the sensors can provide a linear output signal is limited. Accordingly, even when the travel distance of the magnet is limited, a significant number of sensors may be required. This can significantly increase the cost of the position-determining device.

Therefore, a need exists for a position determining apparatus that does not require such a small sensor spacing, while still reliably and accurately determining the position of the magnet.

SUMMARY OF THE INVENTION

The present invention solves these and other needs by providing a sensor that has an increased linear range. This can reduce the number of sensors that are required, and can improve the accuracy of the device. This is preferably accomplished by providing a distributed bridge sensor that has one or more magneto-resistive elements positioned at a first location along the defined path of the magnet, and one or more other magneto-resistive elements positioned at a second location along the defined path. The magneto-resistive elements at the first location thus experience a different magnetic field component than those at the second location. It has been found that the output of such a distributed bridge sensor has an increased linear range relative to the non-distributed bridge sensors of the prior art.

The present invention also contemplates providing a first non-distributed bridge sensor at the first location and a second non-distributed bridge sensor at the second location. A compensation signal may then be generated by differencing the output of the first and second non-distributed bridge sensors. The compensation signal is relatively constant over much of the linear range of the distributed bridge sensor, and can be used to compensate the sensitivity of the distributed bridge sensor for variations in temperature, voltage, etc. The first and second non-distributed bridge sensors also can detect over-travel of the magnet relative to the distributed bridge sensor. When the magnet travels outside of the linear range of the distributed bridge sensor, a controller can set the output signal to a predetermined value to indicate the over-travel condition, and/or activate a neighboring pair of sensors to continue monitoring the position of the magnet.

The distributed bridge sensor can be implemented in a variety of ways. In a first illustrative embodiment, the distributed bridge sensor is formed from two distributed half-bridge sensors. First and second magneto-resistive elements are positioned at a first location along the defined path of the magnet, and third and fourth magneto-resistive elements are positioned at a second location.

The first and fourth magneto-resistive elements are coupled together in a half-bridge configuration to provide a first output signal. Likewise, the third and second magneto-resistive elements are coupled together in a half-bridge configuration to provide a second output signal. A differencing circuit, such as a differential amplifier, may then be used to provide a magnet position signal. The magnet position signal is derived from the difference between the first output signal and the second output signal.

Preferably, the first and second magneto-resistive elements are provided in a first integrated circuit package, and the third and fourth magneto-resistive elements are provided in a second integrated circuit package, although this is not required. In one embodiment, the first and second magneto-resistive elements are collectively rotated relative to the second and third magneto-resistive elements. More specifically, the first and second magneto-resistive elements are collectively rotated toward a center magnetic position between the first and second magneto-resistive elements and the third and fourth magneto-resistive elements. Likewise, the third and fourth magneto-resistive elements are collectively rotated toward the center magnet position.

Alternatively, the distributed bridge sensor may be formed from two distributed full bridge sensors. In this embodiment, first and second magneto-resistive elements are positioned at the first location, and third and fourth magneto-resistive elements are positioned at a second location. In addition, however, fifth and sixth magneto-resistive elements are positioned at the first location, and seventh and eighth magneto-resistive elements are positioned at the second location.

The first magneto-resistive element and the second magneto-resistive element are coupled together in a half-bridge configuration, and provide a first output. The third and fourth magneto-resistive elements are also coupled together in a half-bridge configuration, and provide a second output. The first output and the second output are coupled together to provide a first full bridge output.

Likewise, the fifth and sixth magneto-resistive elements are coupled together in a half-bridge configuration, and provide a third output. The seventh and eighth magneto-resistive elements are also coupled together in a half-bridge configuration, and provide a fourth output. The third output and the fourth output are coupled together to provide a second full bridge output. A differencing circuit, such as a differential amplifier, is then used to provide a magnet position signal that is derived from the difference between the first full bridge output signal and the second full bridge output signal.

Like above, a first over-travel sensor may be provided at the first location for detecting when the magnet passes a first over-travel location along the defined path. Likewise, a second over-travel sensor may be provided at the second location for detecting when the magnet passes a second over-travel location along the defined path. The first and second over-travel location preferably define the linear range of the distributed bridge sensor. When the magnet travels outside of the linear range of the distributed bridge sensor, a controller set the output signal to a predetermined value to indicate the over-travel condition, and/or activates a neighboring sensor pair to continue monitoring the position of the magnet.

The first and second over-travel sensors are preferably non-distributed bridge sensors. A compensation signal may be generated by differencing the output of the first and second over-travel sensors. The compensation signal is relatively constant over much of the linear range of the distributed bridge sensor, and can be used to compensate the sensitivity of the distributed bridge sensor for variations in temperature, voltage, etc.

Methods for determining a position of a magnet movable along a defined path are also contemplated. An illustrative method includes the steps of: sensing the position of the magnet using a distributed bridge sensor; and providing an output signal that is related to the position of the magnet. The method may further include the steps of: sensing the position of the magnet using a first non-distributed bridge sensor, wherein the first non-distributed bridge sensor is located at a first location along the defined path; and sensing the position of the magnet using a second non-distributed bridge sensor, the second non-distributed bridge sensor located at a second location along the defined path.

In providing an output signal, the method may further include the steps of passing a first predetermined voltage to the output terminal when the position of the magnet is left of a predetermined left over-travel location; passing a second predetermined voltage to the output terminal when the position of the magnet is right of a predetermined right over-travel location; and passing the magnet position signal to the output terminal when the position of the magnet is between the predetermined left over-travel location and the predetermined right over-travel location. The first non-distributed bridge sensor may detect when the position of the magnet is left of the predetermined left over-travel location, and the second non-distributed bridge sensor may detect when the magnet is right of the predetermined right over-travel location.

Finally, to compensate for changes in temperature, voltage, etc., the method may include the steps of determining the difference between the position of the magnet sensed by the first non-distributed bridge sensor and the position of the magnet sensed by the second non-distributed bridge sensor, thereby resulting in a measured difference value; comparing the measured difference value to a predetermined compensation value; and changing the supply voltage of the distributed bridge sensor until the measured difference value substantially equals the predetermined compensation value.

DETAILED DESCRIPTION OF THE INVENTION

Figure 1:
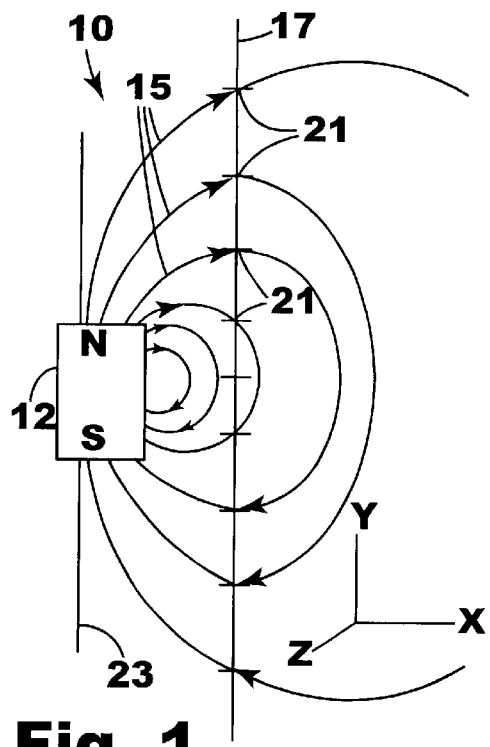
FIG. 1 is a schematic view of a moveable member having a magnet oriented parallel therewith, and a number of adjacent magnetic sensors.

An apparatus for detecting the position of a movable member such as a valve stem is shown in the drawings and is generally designated 10. FIG. 1 shows an enlarged view of magnet 12 and its magnetic flux lines 15. Magnetic sensors 22 (see also FIG. 6A) are located along line 17, for example, at locations 21. Magnet 12 moves along line or path 23. In this embodiment, the magnet poles are oriented parallel to the line or path 23 of magnet 23.

Magnetic sensors 22 may be designed to be sensitive to a magnetic field component in a particular direction, for example, along the x, y or z axis of FIG. 1. One example of this type of sensor is a Hall sensor arranged to be sensitive along the x-axis. Alternatively, magnetic sensors 22 may be designed to be sensitive to a combination of components. One example is a magnetic sensor that includes magneto-resistive material, e.g., permalloy strips connected in a bridge arrangement, lying in the x-y plane and operating in a field strong enough to saturate the permalloy strips. Under these conditions, the resistance change of the permalloy strips is a measure of the angle of the magnetization in the x-y plane and therefore a measure of the angle of the magnetic field. For example, magneto-resistive magnetic sensors include HMC1001, HMC1002, HMC1501, and HMC1512, all available from the assignee of the present invention.

Figure 2:
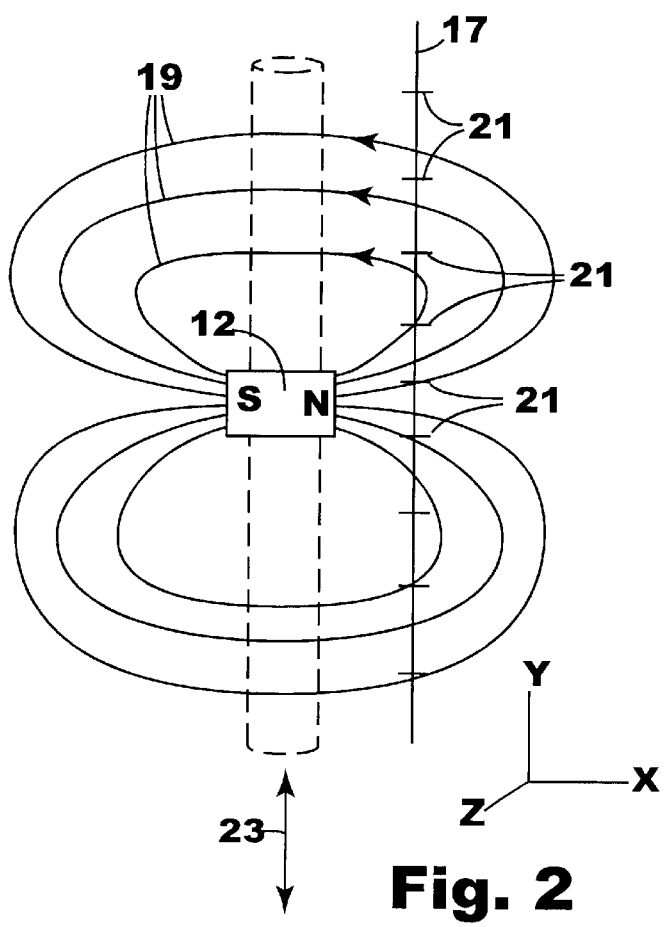
FIG. 2 is a schematic view of a moveable member having a magnet oriented perpendicular thereto, and a number of adjacent magnetic sensors.

FIG. 2 shows another illustrative sensor arrangement having the poles of the magnet 12 oriented perpendicular to line or path 23. Accordingly, the magnetic flux lines 19 of this embodiment are offset by 90 degrees from the flux lines 15 of FIG. 1. For both of the embodiments shown in FIG. 1 and FIG. 2, the magnetic sensors 22 preferably measure the angle of the magnetic field at locations 21.

Figure 3:
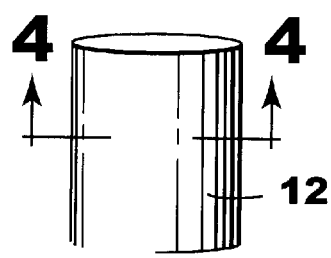
FIG. 3 is a side view of a cylindrically shaped magnet.
Figure 4:
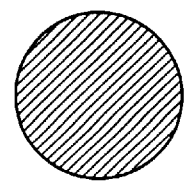
FIG. 4 is a first cross-sectional view of the magnet of FIG. 3, taken along line 4—4.

FIG. 3 is a side view of a cylindrically shaped magnet. The cylindrically shaped magnet 12 may be mounted on the movable member, such as valve stem 14 (see FIG. 6A). FIG. 4 is a first cross-sectional view of the magnet of FIG. 3, taken along line 4—4, showing a soild cross section. A limitation of a magnet having a solid cross-section is that it can be difficult to achieve a high degree of magnetization. One reason for this is that it is difficult to apply a strong magnetic field to the inner material of the magnet.

Figure 5:
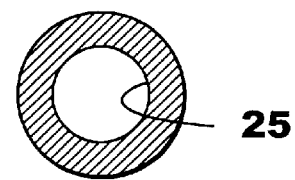
FIG. 5 is a second cross-sectional view of another configuration of the magnet of FIG. 3, taken along line 4—4.

To increase the flux that can be applied to the inner material of the magnet, a bore 25 may be provided through the magnet 12, as shown in FIG. 5. A magnetic field producing device such as a coil may be inserted through the bore 25 during the magnetization of the magnet. This may substantially decrease the difficulty and increase the degree of magnetization of the magnet. To use the magnet of FIG. 5, it is contemplated that the bore 25 may receive the moveable member. In this configuration, the magnet 12 is positioned circumferentially around at least part of the outside surface of the moveable member 14.

Figure 6A:
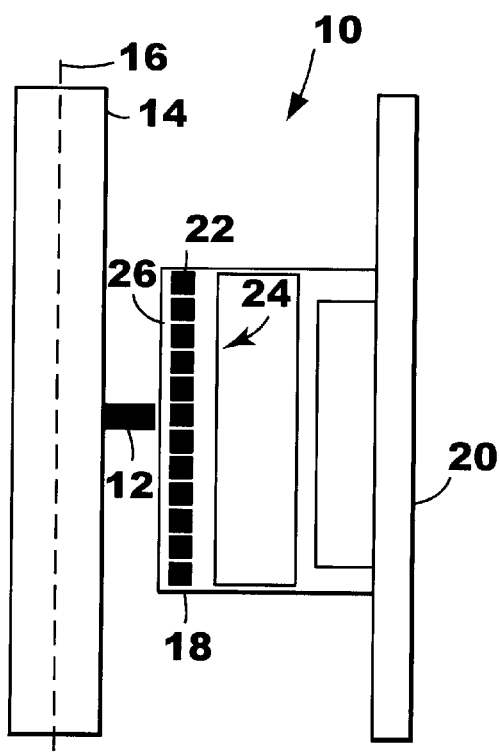
FIG. 6A is a side view of an illustrative embodiment of the present invention, along with a portion of a valve stem and a valve yoke.

FIG. 6A is a side view of a preferred embodiment of the present invention. The position determining apparatus 10 includes a magnet 12 that is attached to valve stem 14 which is in turn attached to other movable valve parts (not shown) that vary the flow through the valve. Valve stem 14 is movable along its longitudinal axis 16. Apparatus 10 also includes a sensor module or electronics module 18, which is mounted to valve yoke 20 or another suitable fixed support located beside valve stem 14. Sensor module 18 includes magnetic sensors 22 arranged in a linear array 24 parallel to longitudinal axis 16 with magnetic sensors 22 spaced a known distance 26 apart.

Magnet 12 moves as valve stem 14 moves, and the magnetic field from magnet 12 also moves along array 24. Magnet 12 provides a magnetic field that can be represented by components along three mutually perpendicular axes. As indicated above, magnetic sensors 22 may be designed to be sensitive to a magnetic field component in a single direction, e.g., along the x-axis, or to be sensitive to magnetic field components in a combination of directions.

Figure 6B:
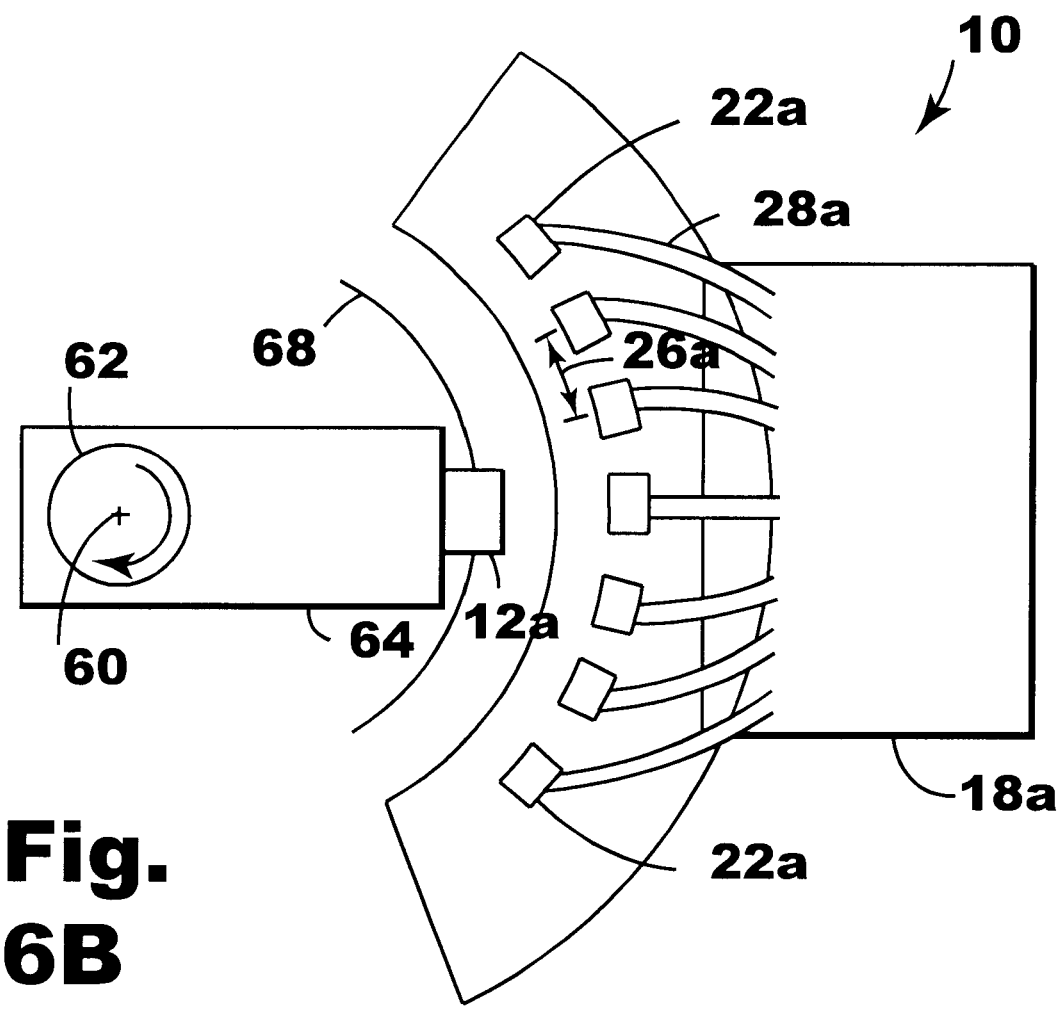
FIG. 6B is a schematic diagram showing yet another illustrative embodiment of the present invention, along with a portion of a rotating valve shaft and an attached arm.

FIG. 6B shows an arrangement of detection apparatus 10 for use with a device wherein the required movement is in a curved path. One example of this type of application is a valve designed for control by rotational movement about an axis 60 of a shaft 62. A crank arm 64 is secured to shaft 62 and movement of end 66 of crankarm 64 controls flow through the valve. Magnetic sensors 22a are connected to electronics module 18a, which is attached to a fixed support. In this arrangement, magneto-resistive magnetic sensors 22a are placed in a curved path representing a portion of a circular path about shaft 62. In other respects, the operation of apparatus 10 illustrated in FIG. 6B is similar to the arrangement shown in FIG. 6A.

Figure 7:
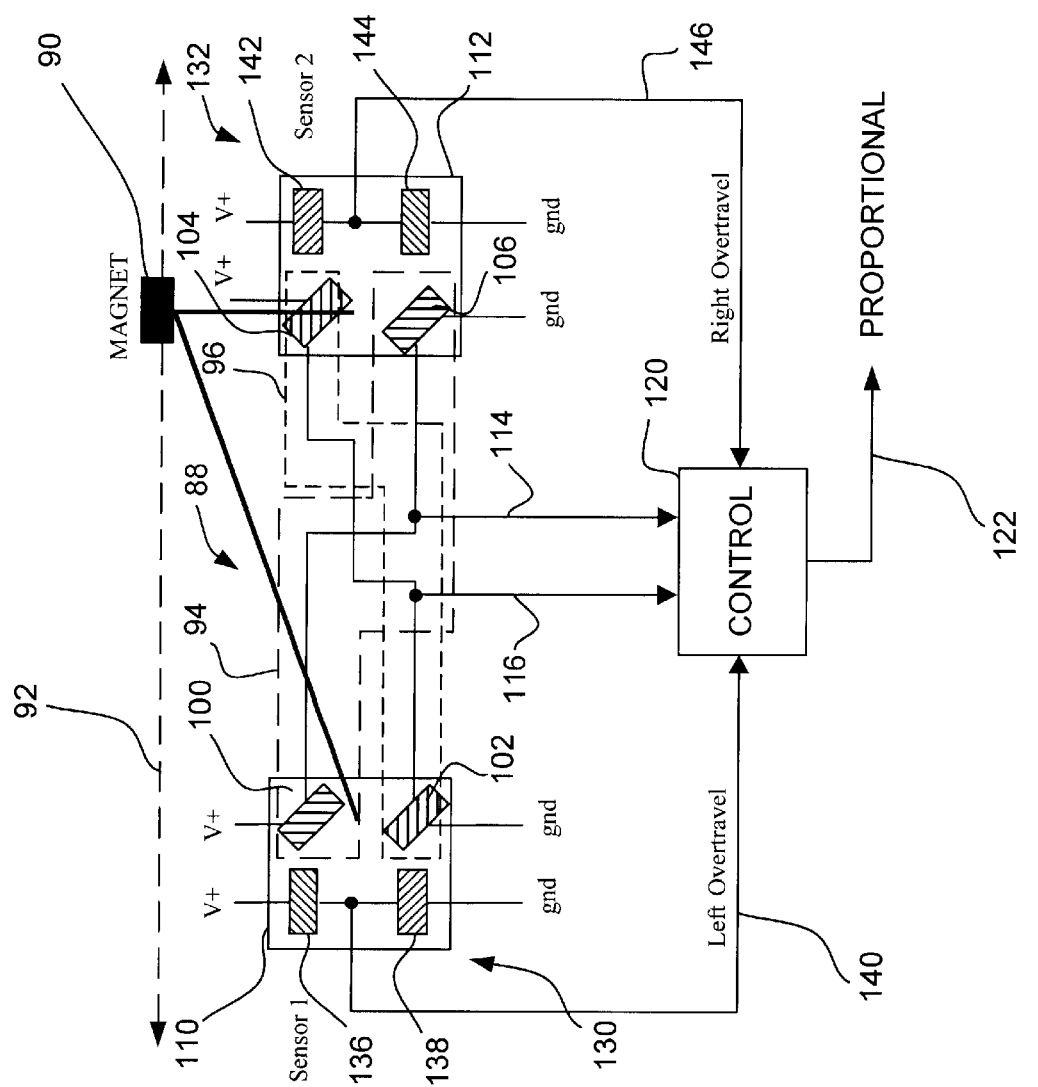
FIG. 7 is a schematic diagram showing an illustrative distributed bridge sensor with over-travel detection in accordance with the present invention.

FIG. 7 is a schematic diagram showing an illustrative distributed bridge sensor 88 in accordance with the present invention. The distributed bridge sensor 88 is positioned adjacent a magnet 90 that is movable along a defined path 92. The defined path 92 preferably extends generally parallel to the distributed bridge sensor 88. The distributed bridge sensor 88 is formed from two distributed half-bridge sensors. A first magneto-resistive element 100 and a second magneto-resistive element 102 are positioned at a first location 110 along the defined path 92, and a third magneto-resistive element 104 and a fourth magneto-resistive element 106 are positioned at a second location 112. The first location 110 is spaced from the second location 112 by a distance, preferably at least 0.1 mm. In a preferred embodiment, the first magneto-resistive element 100 and the second magneto-resistive element 102 are provided in a first integrated circuit package, and the third magneto-resistive element 104 and the fourth magneto-resistive element 106 are provided in a second integrated circuit package.

The first magneto-resistive element 100 and the fourth magneto-resistive element 106 are coupled together in a half-bridge configuration to provide a first output signal 114. Preferably, the first and fourth magneto-resistive elements are hearing bone magneto-resistive sensors, with the hearing bone pattern extending in substantially the same direction. Likewise, the third magneto-resistive element 104 and the second magneto-resistive element 102 are coupled together in a half-bridge configuration to provide a second output signal 116. Preferably, the second and third magneto-resistive elements are also hearing bone magneto-resistive sensors, with the hearing bone pattern extending in substantially the same direction, but orthogonal to the hearing bone pattern of the first and fourth magneto-resistive elements. Given sufficient spacing, the magnetic field direction at the first location 110 is different from the magnetic field direction at the second location 112.

A control block 120 accepts the first output signal 114 and the second output signal 116, and provides a proportional output signal 122. In a preferred embodiment, the control block 120 includes a differencing circuit, such as a differential amplifier, that differences the first output signal 114 and the second output signal 116 to provide the proportional output signal 122. It has been found that the proportional output signal 122 of the distributed bridge sensor has an increased linear range relative to non-distributed bridge sensors.

Figure 13:
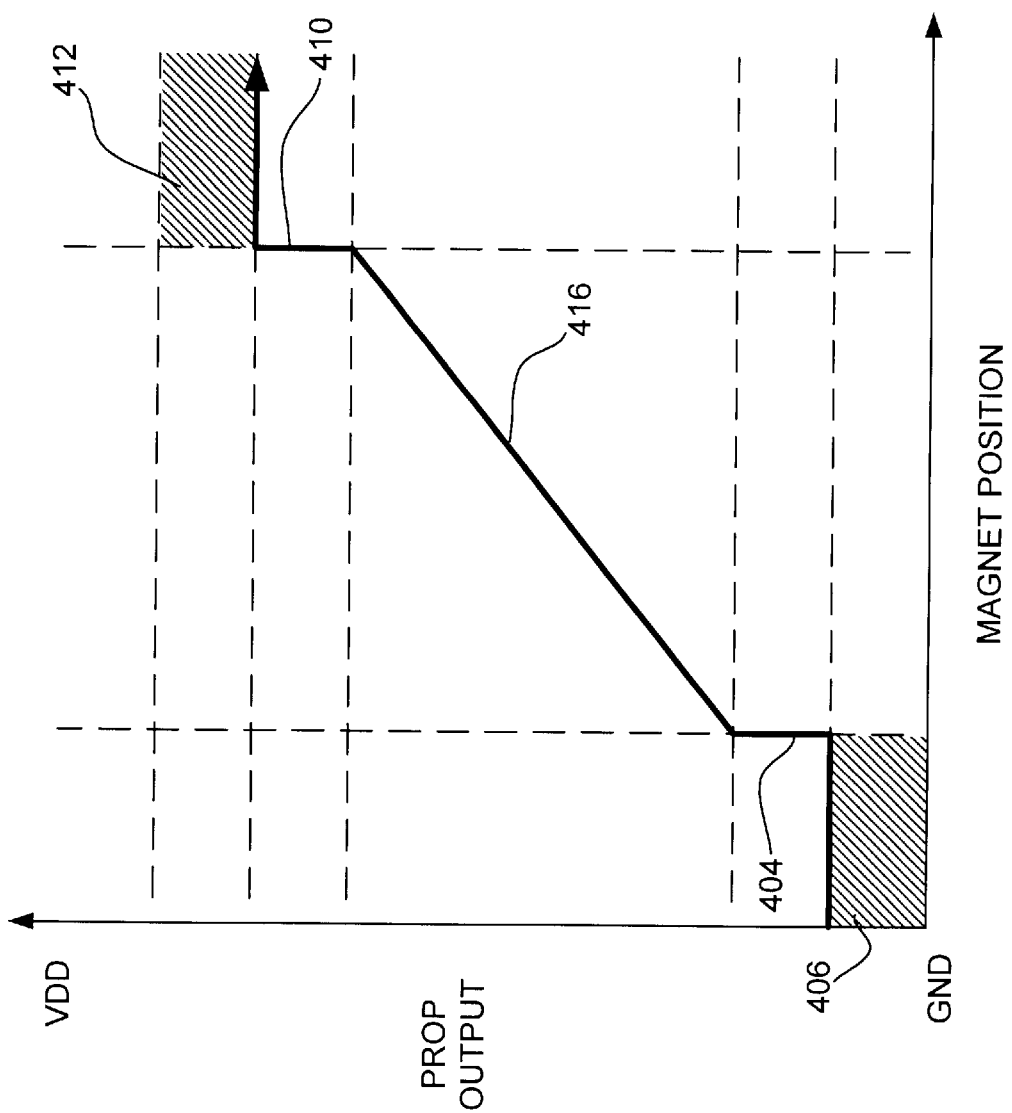
FIG. 13 is a graph showing the proportional output signal of FIG. 12 versus magnet position.

A first over-travel sensor 130 may be provided at the first location 110, and a second over-travel sensor 132 may be provided at the second location 112. The first over-travel sensor 130 senses the position of the magnet from the first location, and the second over-travel sensor 132 senses the position of the magnet from the second location. Thus, the first over-travel sensor 130 can be used for detecting when the magnetic 90 passes a first (left) over-travel location along the defined path 90. Likewise, the second over-travel sensor 132 can be used for detecting when the magnet 90 passes a second (right) over-travel location along the defined path 90. The first and second over-travel locations preferably define the linear range of the distributed bridge sensor. When the magnet 90 travels outside of the linear range of the distributed bridge sensor, control block 120 may set the proportional output signal 122 to a predetermined value (see FIG. 13) to indicate the over-travel condition, and/or activate a neighboring sensor pair for continued monitoring of the position of the magnet (see FIG. 14).

The first and second over-travel sensors 130 and 132 are preferably non-distributed bridge sensors. In the illustrative embodiment, the first over-travel sensor 130 includes a first magneto-resistive element 136 and a second magneto-resistive element 138 connected in a half bridge configuration, and provides a first over travel output signal 140. Likewise, the second over-travel sensor 132 includes a first magneto-resistive element 142 and a second magneto-resistive element 144 connected in a half bridge configuration, and provides a second over travel output signal 146.

The first over-travel output signal 140 can be used to determine when the magnet 90 is located at a first over-travel location. In one example, the first over-travel location may correspond to the location directly overhead of the first over-travel sensor 130. By examining when the first over-travel output signal 140 crosses a mid-point value between the supply (V+) and ground, the control block 120 may identify when the magnet 90 is at such a location. It is contemplated that the location of the first over-travel location may be changed by rotating the first over travel sensor 130 and/or defining a different trigger voltage for the first over-travel output signal 140. The second over-travel output signal 146 can be used to determine when the magnet 90 is located at a second over-travel location in a like manner.

Another use for the first and second over-travel sensors 130 and 132 is to generate a compensation signal that is sensitive to changes in temperature, voltage, etc. The compensation signal can then be used to provide compensation to the distributed bridge sensor. In a preferred embodiment, the control block 120 generates a compensation signal by differencing the first over-travel output signal 140 and the second over-travel output signal 146. Given proper sensor spacing, such a compensation signal is relatively constant over much of the linear range of the distributed bridge sensor 88, and any voltage changes in the compensation signal can be attributed to sensitivity variations due to temperature, voltage, etc. A compensation block (see FIG. 12) may then detect changes in the compensation signal, and provide a corresponding change in the supply voltage that is provided to the distributed bridge sensor 88 to effectively cancel out the changes in sensitivity of the distributed bridge sensor.

Figure 8:
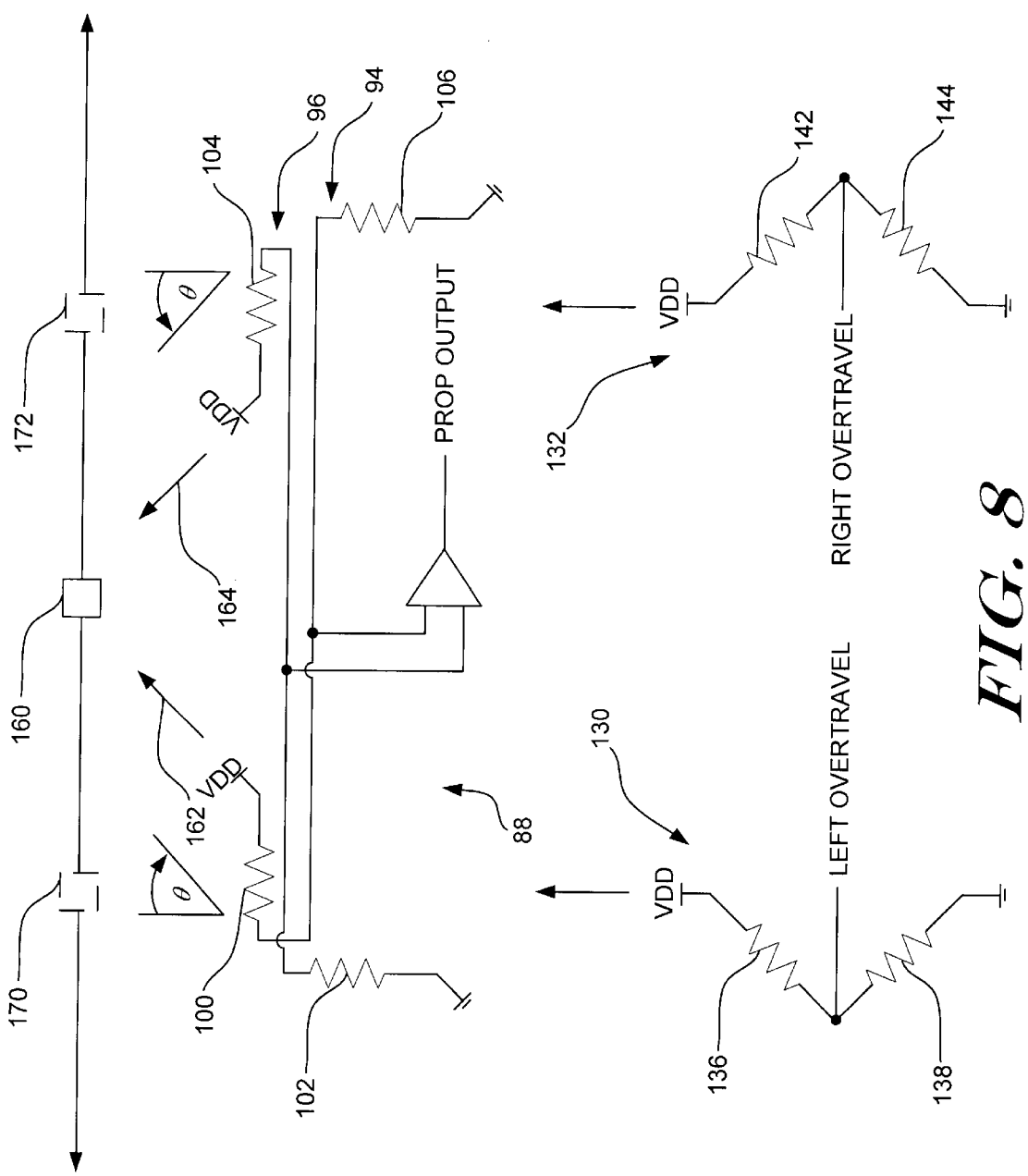
FIG. 8 is a schematic diagram of another illustrative distributed bridge sensor with rotated magneto-resistive elements for increased linearity and compensation control.

FIG. 8 is a schematic diagram of another illustrative distributed bridge sensor in accordance with the present invention. This embodiment is similar to that shown and described with reference to FIG. 7. However, each of the half bridges 94 and 96 of the distributed bridge 88 is rotated toward a central magnet location 160. Preferably, each of the half bridges 94 and 96 are rotated 45 degrees.

Each half bridge 94 and 96 preferably produces an output signal that is mid-way between VDD and ground when the magnet is directly overhead, as indicated by arrows 162 and 164, respectively. As the magnet moves sufficiently far from the overhead location in either direction, the half bridges 94 and 96 enter a non-linear region. Thus, there is a linear region that extends a certain distance in both directions from the overhead location. By rotating each of the half bridges 94 and 96 toward the central magnet location 160, the linear regions on both sides of the overhead location are used when the magnet is between the left and right over-travel locations 170 and 172, respectively. Accordingly, the distributed sensor 88 may have an increased linear range relative to the distributed bridge sensor of FIG. 7. This may increase the linearity of the sensor, and/or increase the allowed sensor spacing. The first and second over-travel sensors 130 and 132 may operate in a similar manner to the over-travel sensors described with reference to FIG. 7.

Figure 9:
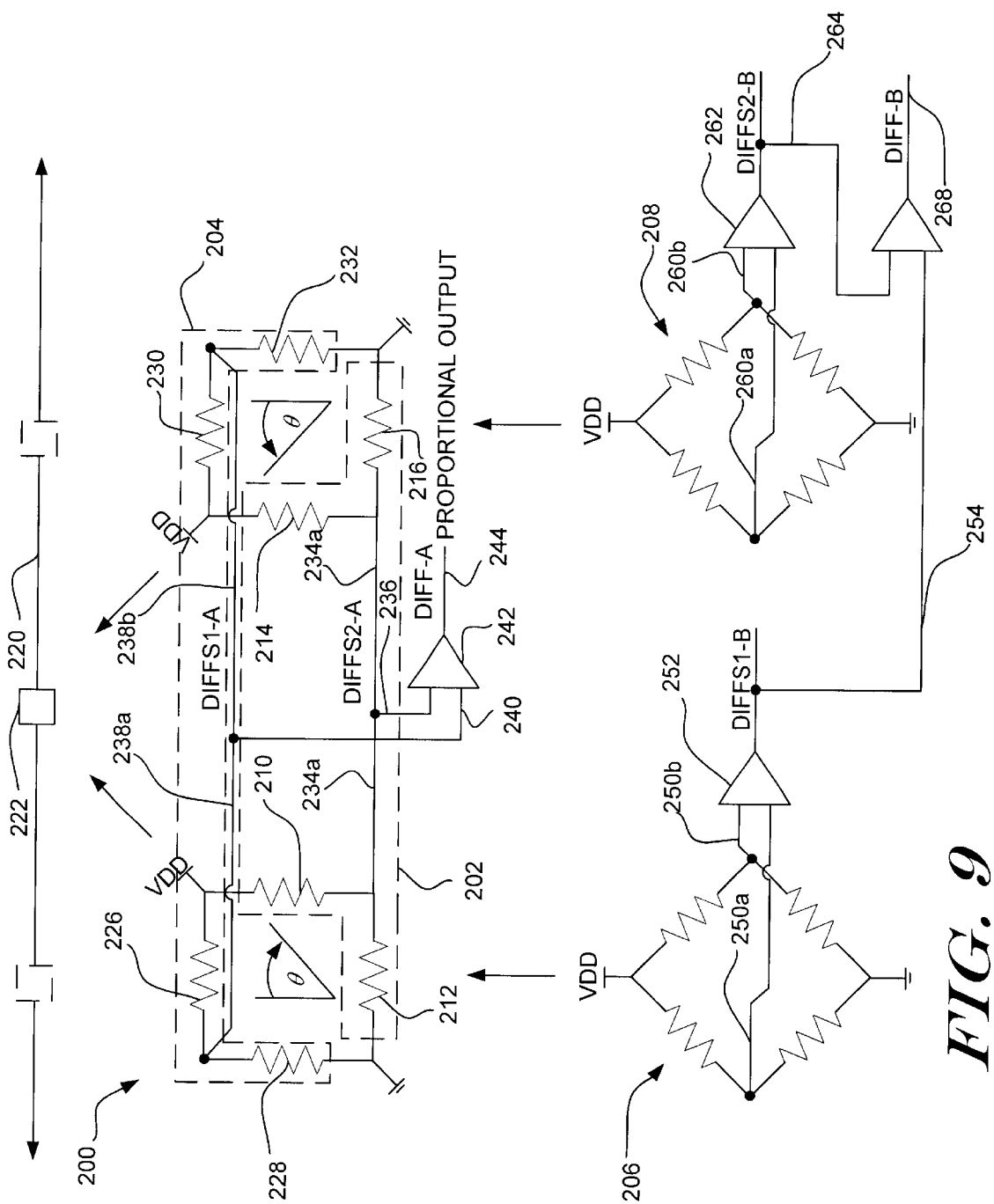
FIG. 9 is a schematic diagram showing yet another illustrative distributed bridge sensor with over-travel detection in accordance with the present invention.

FIG. 9 is a schematic diagram showing yet another illustrative distributed bridge sensor with over-travel detection in accordance with the present invention. In this embodiment, a distributed bridge sensor 200 is formed from a first distributed full bridge sensor 202 and a second distributed full bridge sensor 204. In addition, the first over-travel sensor 206 and the second over-travel sensor 208 are each non-distributed full bridge sensors rather than half-bridge sensors.

The first distributed full bridge sensor 202 includes a first magneto-resistive element 210, a second magneto-resistive element 212, a third magneto-resistive element 214, and a fourth magneto-resistive element 216. The first magneto-resistive element 210 and the second magneto-resistive element 212 are positioned at a first location along the defined path 220 of the magnet 222. The third magneto-resistive element 214 and the fourth magneto-resistive element 216 are positioned at a second location, wherein the second location is spaced from the first location.

The second distributed full bridge sensor 204 includes a fifth magneto-resistive element 226, a sixth magneto-resistive element 228, a seventh magneto-resistive element 230, and an eighth magneto-resistive element 232. The fifth magneto-resistive element 226 and the sixth magneto-resistive element 228 are positioned at the first location, and the seventh magneto-resistive element 230 and the eighth magneto-resistive element 232 are positioned at the second location.

The first magneto-resistive element 210 and the second magneto-resistive element 212 are-coupled together in a half-bridge configuration, and provide a first output signal 234a. The third magneto-resistive element 214 and the fourth magneto-resistive element 216 are also coupled together in a half-bridge configuration, and provide a second output signal 234b. The first output signal 234a and the second output signal 234b are coupled together to provide a first full bridge output 236 (DIFFS2-A).

Likewise, the fifth magneto-resistive element 226 and the sixth magneto-resistive element 228 are coupled together in a half-bridge configuration, and provide a third output signal 238a. The seventh magneto-resistive element 230 and the eighth magneto-resistive element 232 are also coupled together in a half-bridge configuration, and provide a fourth output signal 238b. The third output signal 238a and the fourth output signal 238b are coupled together to provide a second full bridge output 240 (DIFFS1-A). A differencing circuit, such as differential amplifier 242, is then used to provide a magnet position signal 244 (DIFF-A) by differencing the first full bridge output signal 236 and the second full bridge output signal 240.

It is contemplated that the first distributed full bridge sensor 202 and a second distributed full bridge sensor 204 may each be rotated toward a central magnet position, as shown. As described above, this may help improve the linearity of the sensor and/or increase the allowed sensor spacing.

A first full bridge over-travel sensor 206 may be provided at the first location for detecting when the magnet passes a first over-travel location along the defined path 220. Likewise, a second full bridge over-travel sensor may be provided at the second location for detecting when the magnet passes a second over-travel location along the defined path 220. The first and second over-travel locations preferably define the linear range of the distributed bridge sensor 200. When the magnet travels outside of the linear range of the distributed bridge sensor 200, a controller or the like can set the magnet position signal 244 to a predetermined value, and/or activate a neighboring pair of sensors to continue monitoring the position of the magnet.

The first and second over-travel full bridge sensors 206 and 208 are preferably non-distributed bridge sensors. In the embodiment shown, the first over-travel sensor 206 includes a full bridge sensor and provides two differential outputs 250a and 250b. A differencing circuit, such as a differential amplifier 252, is then used to provide a first over-travel signal 254 (DIFFS1-B). Likewise, the second over-travel sensor 208 includes a full bridge sensor and provides two differential outputs 260a and 260b. A differencing circuit, such as a differential amplifier 262, is then used to provide a second over-travel signal 264 (DIFFS2-B). The zero-crossing point of the first over-travel signal 254 may indicate when the magnet 222 passes over a left over-travel position. Likewise, the zero-crossing point of the second over-travel signal 264 may indicate when the magnet 222 passes over a right over-travel position.

The left and right over-travel signals 254 and 264 may also be used to generate a compensation signal 268 (DIFF-B), which can help provide compensation for variations in sensitivity of the distributed bridge sensor 200 caused by changes in temperature, voltage, etc. In the embodiment shown, the compensation signal 268 is generated by differencing the first over-travel signal 254 (DIFFS1-B) and the second over-travel signal 264 (DIFFS2-B), as shown.

Figure 10:
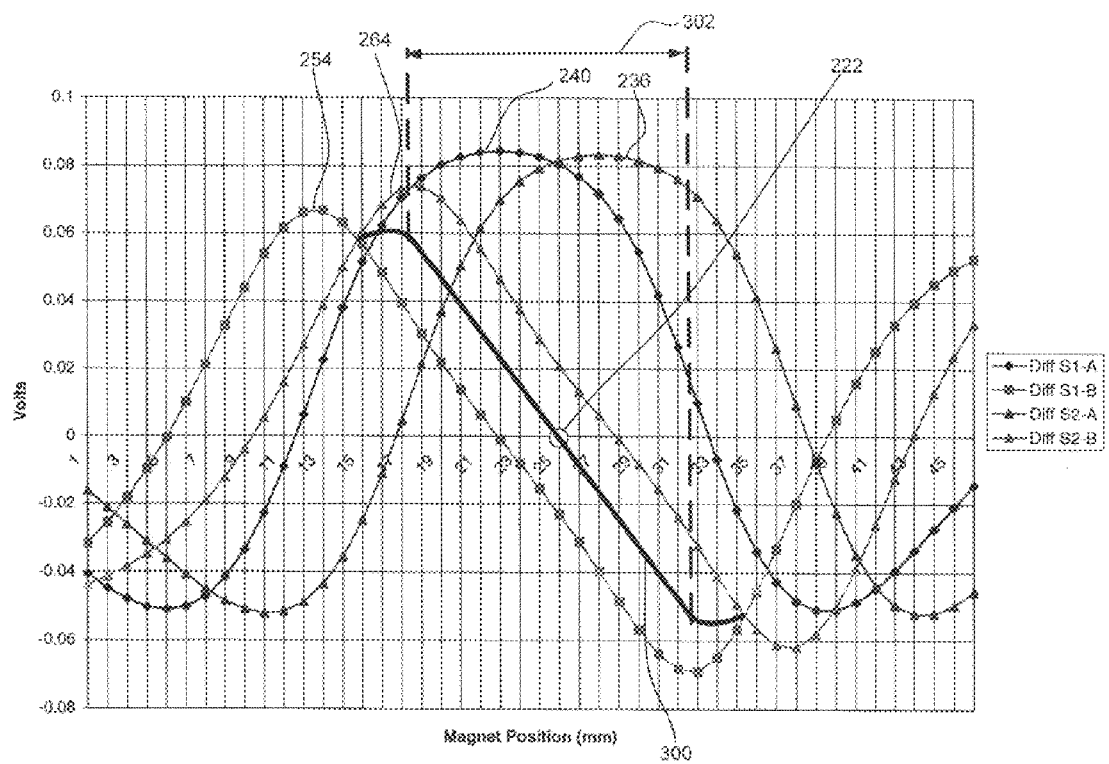
FIG. 10 is a graph showing various signals of the distributed bridge sensor of FIG. 9 versus magnet position.

FIG. 10 is a graph showing various signals of the distributed bridge sensor of FIG. 9 versus magnet position. The center magnet position is labeled 222, and corresponds to a magnet position of 26 mm. The first over-travel signal 254 (DIFFS1-B) has a zero-crossing point at about 23 mm, which is the left over-travel location, and in the embodiment shown, corresponds to the first location. That is, the first magneto-resistive element 210, the second magneto-resistive element 212, the fifth magneto-resistive element 226, the sixth magneto-resistive element 228, and the first over-travel full bridge sensor 206 are all positioned substantially at about 23 mm.

Likewise, the second over-travel signal 264 (DIFFS2-B) has a zero-crossing point at about 29 mm, which is the right over-travel location and in the embodiment shown, corresponds to the second location. That is, the third magneto-resistive element 214, the fourth magneto-resistive element 216, the seventh magneto-resistive element 230, the eighth magneto-resistive element 232, and the second over-travel full bridge sensor 208 are all positioned substantially at about 29 mm. Accordingly, the first location is spaced from the second location by about 6 mm (29 mm–23 mm).

Co-pending U.S. patent application Ser. No. 09/059,798, filed Apr. 14, 1998, entitled "POSITION DETECTION APPARATUS WITH CORRECTION FOR NON-LINEAR SENSOR REGIONS" discloses using various ratios of the first over-travel signal 254 (DIFFS1-B) and the second over-travel signal 264 (DIFFS2-B) to provide a magnet position signal. One such magnet position signal, derived using the ratio A/(A-B), is shown at 300. A limitation of such an approach is that the linear range 302 of the magnet position signal 300 is limited. In the embodiment shown, the linear range 302 of the magnet position signal 300 extends from about 19 mm to about 33 mm, and therefore the sensor would have a linear range of about 14mm (33 mm–19 mm). Another limitation is that the linearity of the magnet position signal 300 in the linear range 302 may be less than optimal. Co-pending U.S. patent application Ser. No. 09/059,798, filed Apr. 14, 1998, entitled "POSITION DETECTION APPARATUS WITH CORRECTION FOR NON-LINEAR SENSOR REGIONS" described several methods for reducing or correcting these non-linearity's.

Figure 11:
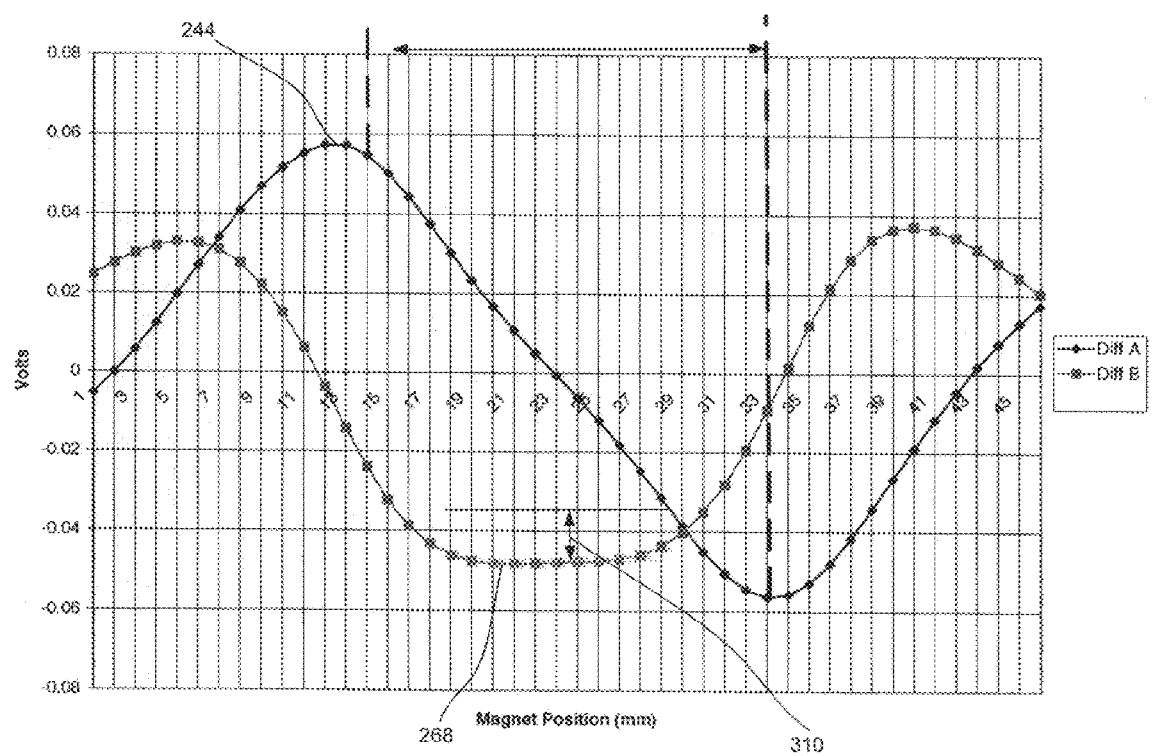
FIG. 11 is a graph showing the output signals DIFF-A and DIFF-B of the distributed bridge sensor of FIG. 9 versus magnet position.

To provide an improved linear range and increased linearity in the linear range of the sensor, a distributed bridge sensor is employed as described above. The first full bridge output signal 236 of the distributed bridge sensor 200 is shown peaking to the right of the center magnet position 222. Likewise, the second full bridge output signal 240 of the distributed bridge sensor 200 is shown peaking to the left of the center magnet position 222. In this arrangement, the difference between the first full bridge output signal 236 and the second full bridge output signal 240 is linear, and can be used as a magnet position signal 244 (DIFF-A). The resulting magnet position signal 244 (DIFF-A) is shown in FIG. 11.

The linear range of the magnet position signal 244 is about 18 mm (33 mm–15 mm), which is 28% greater than the magnet position signal 300 of FIG. 10. In addition, the linearity of the linear region of the magnet position signal 244 may be improved. It is contemplated, however, that those methods disclosed in co-pending U.S. patent application Ser. No. 09/059,798, filed Apr. 14, 1998, entitled "POSITION DETECTION APPARATUS WITH CORRECTION FOR NON-LINEAR SENSOR REGIONS" may be applied to the present invention for correcting any non-linearity's in the magnet position signal 244, if desired.

The first over-travel signal 254 (DIFFS1-B) and the second over-travel signal 264 (DIFFS2-B) may also be used to generate a compensation signal 268 (DIFF-B), which can help provide compensation for variations in sensitivity of the distributed bridge sensor 200 that are caused by changes in temperature, voltage, etc. The compensation signal (DIFF-B) is shown at 268 in FIG. 11, and is generated by differencing the first over-travel signal 254 (DIFFS1-B) and the second over-travel signal 264 (DIFFS2-B). As can be seen, the compensation signal 268 (DIFF-B) is relatively constant over much of the linear range of the distributed bridge sensor 200.

Variations in the compensation signal 268 (DIFF-B) can often be attributed to changes in the sensitivity of the first over-travel sensor 206 and the second over-travel sensor 208. Thus, it is contemplated that the difference between the first over-travel signal 254 (DIFFS1-B) and the second over-travel signal 264 (DIFFS2-B) can be measured and compared to an expected difference value. The supply voltage to the distributed bridge sensor 200 can then be changed until the measured difference substantially equals the expected difference value. By changing the supply voltage to the distributed bridge sensor 200, the sensitivity of the distributed bridge sensor 200 can be adjusted to effectively cancel any changes in the sensitivity due to temperature, voltage, etc.

Figure 12:
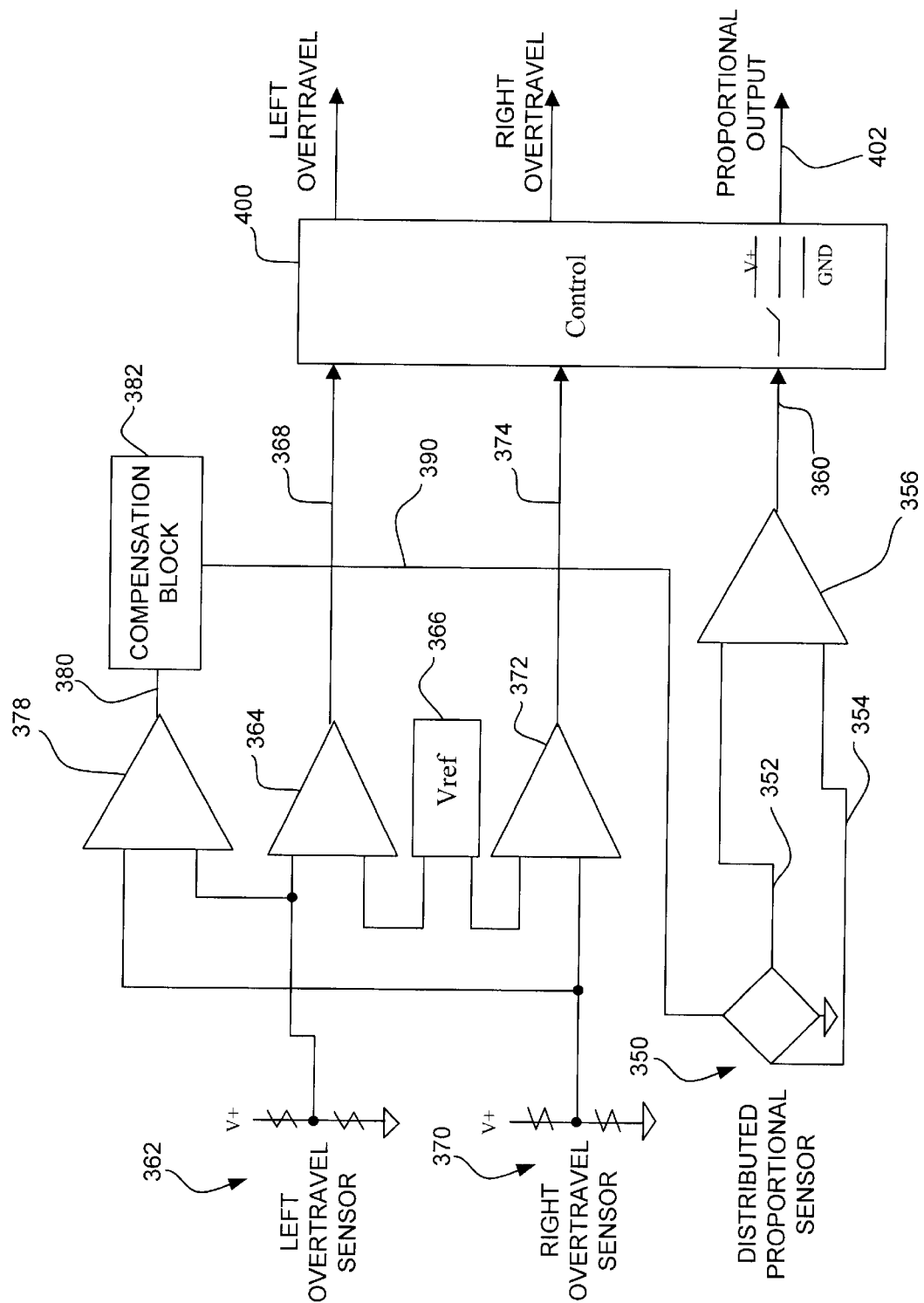
FIG. 12 is a schematic diagram of an illustrative distributed bridge sensor with over-travel detection, temperature compensation, and output control.

FIG. 12 is a schematic diagram of an illustrative distributed bridge sensor with over-travel detection, temperature compensation, and output control. The distributed bridge sensor 350 is formed from two distributed half bridge sensors, as more fully described with reference to FIGS. 7–8. The distributed bridge sensor 350 provides a first output signal 352 and a second output signal 354. A differencing circuit, such as a differential amplifier 356, differences the first output signal 352 and the second output signal 354 to provide the magnet position signal (e.g., proportional output signal) 360.

A left over-travel sensor 362 detects when the magnet (not shown) passes a left over-travel location along the defined path. Since the left over-travel sensor 362 is shown as a half-bridge, the output of the left over-travel sensor 362 is compared to a reference voltage by differential amplifier 364. The reference voltage is provided by a reference voltage source 366, and in the embodiment shown, is preferably mid-way between the supply voltage VDD and ground. Thus, when the output signal 368 of differential amplifier 364 crosses zero, the magnet has passed the left over-travel location.

Likewise, a right over-travel sensor 370 detects when the magnetic (not shown) passes a right over-travel location along the defined path. Since the right over-travel sensor 370 is shown as a half-bridge, the output of the right over-travel sensor 370 is compared to a reference voltage by differential amplifier 372. Like above, the reference voltage is provided by reference voltage source 366, and in the embodiment shown, is preferably mid-way between the supply voltage VDD and ground. Thus, when the output signal 374 of differential amplifier 372 crosses zero, the magnet has passed the right over-travel location.

Another use for the first and second over-travel sensors 362 and 370 is to generate a compensation signal 380 that is sensitive to changes in temperature, voltage, etc. The compensation signal can be used to provide compensation to the distributed bridge sensor 350. In the illustrative embodiment, a differential amplifier 378 differences the output of the left over-travel sensor 362 and the output of the right over-travel sensor 370. The compensation signal 380 will be relatively constant over much of the linear range of the distributed bridge sensor 350, and any voltage changes in the compensation signal 380 can be attributed to sensitivity variations due to temperature, voltage, etc. A compensation block 382 detects changes in the compensation signal 380, and provides a corresponding change in the supply voltage 390 that is provided to the distributed bridge sensor 350 to effectively cancel out the changes in sensitivity of the distributed bridge sensor 350.

Control block 400 receives the output signal 368 of differential amplifier 364, which indicates when the magnet passes the left over-travel location. Control block 400 also receives the output signal 374 of differential amplifier 372, which indicates when the magnet passes the right over-travel location. Finally, the control block 400 accepts the magnet position signal 360 provided by differential amplifier 356. The control block 400 preferably provides an output signal resembling that shown in FIG. 13.

For magnet positions that are to the left of the left over-travel location, as indicated by the output signal 368 of differential amplifier 364, the control block 400 may provide a first predetermined output voltage on output terminal 402. The first predetermined voltage is preferably above ground, but below the magnet position signal 360 provided by differential amplifier 356. This allows a step 404 in the output signal 402 when the magnet passes the left over-travel location. Voltages between the first predetermined voltage and ground are preferably reserved for diagnostic purposes, such as detecting shorts to ground or the like. One such diagnostic region is shown at 406.

For magnet positions that are to the right of the right over-travel location, as indicated by the output signal 374 of differential amplifier 372, the control block 400 may provide a second predetermined output voltage on output terminal 402. The second predetermined voltage is preferably above the magnet position signal 360 provided by differential amplifier 356, but below the supply voltage VDD. This allows a step 410 in the output signal 402 when the magnet passes the right over-travel location. Voltages between the second predetermined voltage and the supply voltage are preferably reserved for diagnostic purposes, such as detecting shorts to the supply or the like. One such diagnostic region is shown at 412.

Between the left and right over-travel location, the control block 400 may pass the magnet position signal 360 provided by differential amplifier 356. This signal is preferably relatively linear with magnet position as shown at 416. The embodiment shown in FIG. 12 is only meant to be illustrative. Numerous variations are contemplated, including providing a full distributed bridge sensor, full bridge over-travel sensors, etc. An advantage of the illustrative embodiment is that no microprocessor or the like is required, which may significantly reduce the cost of producing the sensor.

Figure 14:
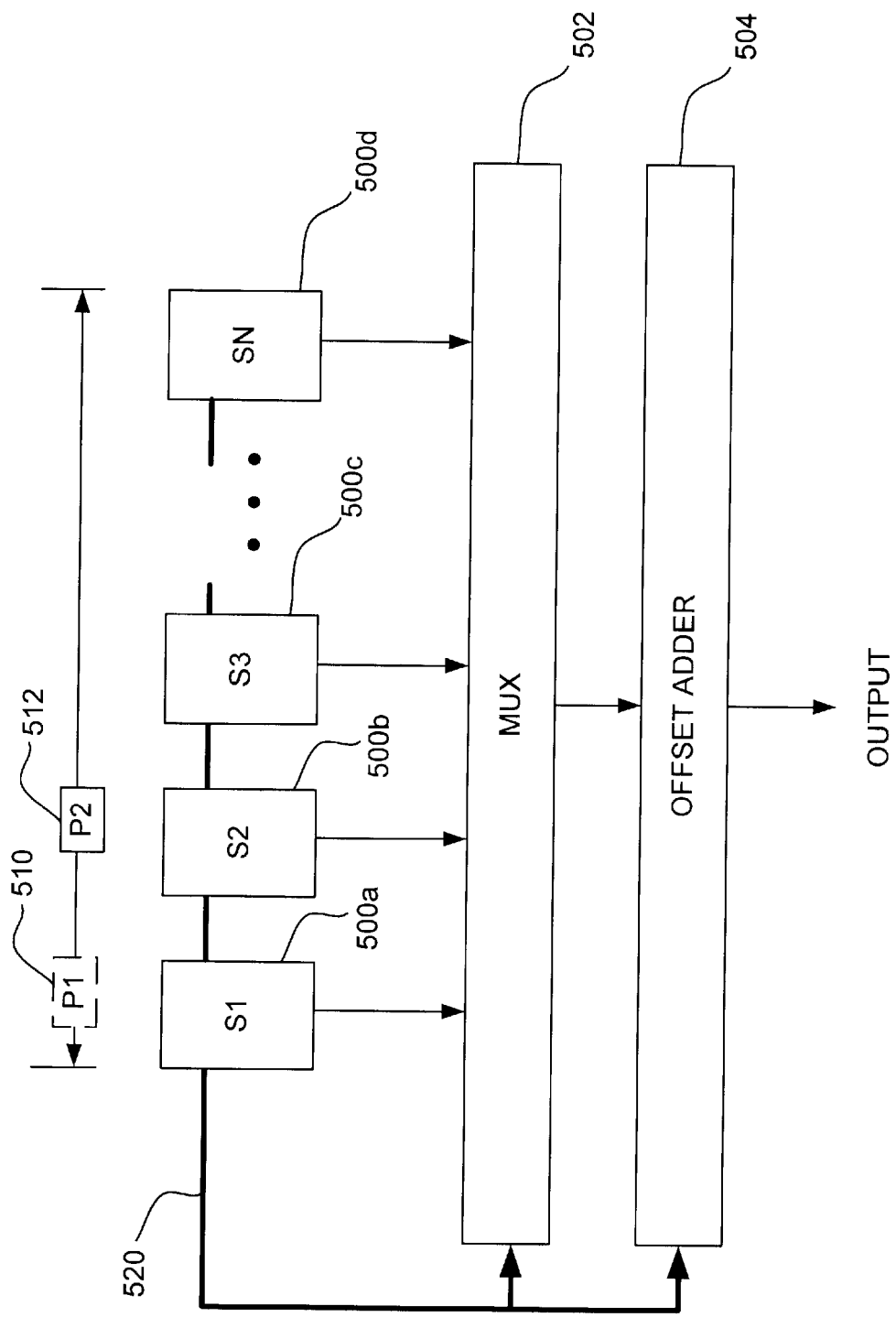
FIG. 14 is a schematic diagram of an illustrative array of distributed bridge sensors in accordance with the present invention.

FIG. 14 is a schematic diagram of an illustrative array of distributed bridge sensors in accordance with the present invention. It is contemplated that a number of distributed bridge sensors 500*a*, 500*b*, 500*c*, and 500*d* may be provided generally parallel to the defined path of the magnet. A multiplexer 502 or the like may select the output of one (or more) of the sensors 500*a*, 500*b*, 500*c*, and 500*d*, and provide the output signal of the selected sensor to an offset adder 504. The offset adder may add an offset voltage to the output signal of the selected sensor, and provide an output signal that is representative of the overall position of the magnet.

In the illustrative embodiment, the left and right over-travel sensor outputs are used by the multiplexer 502 to select the appropriate sensor 500*a*, 500*b*, 500*c*, and 500*d*. For example, when the magnet is at position P1 500, distributed sensor 500*a* may be selected because neither the left or right over-travel sensor outputs are asserted. The remaining sensors 500*b*, 500*c* and 500*c* each have the left over-travel sensor output asserted. As the magnet moves toward position P2 512, the right over-travel sensor output of sensor 500*a* is asserted, and the left over-travel sensor output of sensor 500*b* is de-asserted. The remaining sensors 500*c* and 500*d* each continue to have the left over-travel sensor output asserted. Thus, the left and/or right over-travel sensor outputs of sensors 500*a*, 500*b*, 500*c* and 550*d*, as generally shown at 520, can be used as an "address", and may be provided to multiplexer 502 for selecting the appropriate sensor 500*a*, 500*b*, 500*c* or 500*d*, depending the magnet position.

The output signal of the selected sensor 500*a*, 500*b*, 500*c* or 500*d* is then provided to offset adder 504. The offset adder 503 may add an appropriate increment to the output signal of the selected sensor. The increment that is added depends on the location of the magnet. Preferably, the increment to be added is a multiple of the Full-Scale Output Voltage range divided by the number of sensors−1. That is, if the full scale output voltage is 5.0V, and the number of sensors is 6, then the increment that is added should be a multiple of 5.0V/(6−1)=1V.

In the embodiment shown, and if the first sensor 500*a* is selected, then no increment is added to the sensor output. If the second sensor 500*b* is selected, then 1V is added to the sensor output signal. If the third sensor 500*c* is selected, then 2V is added to the sensor output signal, and so on. Like above, the left and/or right over-travel sensor outputs of sensors 500*a*, 500*b*, 500*c* and 550*d*, as generally shown at 520, can be used as an "address", and may be provided to the offset adder 504 for selecting the appropriate increment to add. With proper calibration, the result is a continuous linear output signal that is representative of the overall position of the magnet along the defined path.

Having thus described the preferred embodiments of the present invention, those of skill in the art will readily appreciate that the teachings found herein may be applied to yet other embodiments within the scope of the claims attached hereto.

What is claimed is:

1. A distributed bridge for detecting the position of a magnet that is movable along a defined path, the magnet having a first polarity pole and a second polarity pole with no intermediate poles therebetween, the magnet producing a magnetic field, comprising:

two or more magneto-resistive elements connected in a bridge configuration, one of the magneto-resistive elements is positioned at a first location along the defined path and sense the magnetic field of the magnet at the first location, and another one of the magneto-resistive elements is positioned at a second location along the defined path and sense the magnetic field of the magnet at the second location, wherein the first location is spaced from the second location.

2. A distributed bridge according to claim 1, wherein the first location is spaced from the second location by at least 0.1 mm.

3. A distributed bridge according to claim 1, wherein the one of the magneto-resistive elements is in a first integrated circuit package, and the other one of magneto-resistive elements is in a second integrated circuit package.

4. A distributed bridge according to claim 1, wherein the two or more magneto-resistive elements include a first magneto-resistive element, a second magneto-resistive element, a third magneto-resistive element and a fourth magneto-resistive element, the first magneto-resistive element and the second magneto-resistive element are positioned at the first location and the third magneto-resistive element and the fourth magneto-resistive element are positioned at the second location.

5. A distributed bridge according to claim 4, wherein the first magneto-resistive element and the fourth magneto-resistive element are coupled together in a half-bridge configuration for providing a first output signal.

6. A distributed bridge according to claim 5, wherein the third magneto-resistive element and the second magneto-resistive element are coupled together in a half-bridge configuration for providing a second output signal.

7. A distributed bridge according to claim 4, wherein a fifth magneto-resistive element and a sixth magneto-resistive element are positioned at the first location and a seventh magneto-resistive element and an eighth magneto-resistive element are positioned at the second location.

8. A distributed bridge according to claim 7, wherein the first magneto-resistive element and the second magneto-resistive element are coupled together in a half-bridge configuration having a first output, and the third magneto-resistive element and the fourth magneto-resistive element are coupled together in a half-bridge configuration having a second output, wherein the first output and the second output are coupled together to provide a first bridge output.

9. A distributed bridge according to claim 8, wherein the fifth magneto-resistive element and the sixth magneto-resistive element are coupled together in a half-bridge configuration having a third output, and the seventh magneto-resistive element and the eighth magneto-resistive element are coupled together in a half-bridge configuration having a fourth output, wherein the third output and the fourth output are coupled together to provide a second bridge output.

10. Apparatus for determining the position of a magnet that is movable along a defined path, the magnet having a first polarity pole and a second polarity pole with no intermediate poles therebetween, the magnet producing a magnetic field, comprising:

first magnetic sensor means positioned at a first location along the defined path for sensing the magnetic field of the magnet at the first location;

second magnetic sensor means positioned at a second location along the defined path for sensing the magnetic field of the magnet at the second location, wherein the second location is spaced from the first location;

the first magnetic sensor means including a first magneto-resistive element and a second magneto-resistive element;

the second magnetic sensor means including a third magneto-resistive element and a fourth magneto-resistive element;

the first magneto-resistive element of the first magnetic sensor means is coupled to the fourth magneto-resistive element of the second magnetic sensor means in a half-bridge configuration for providing a first output signal; and the third magneto-resistive element of the second magnetic sensor means is coupled to the second magneto-resistive element of the first magnetic sensor means in a half-bridge configuration for providing a second output signal.

11. Apparatus according to claim 10, further comprising a differencing means for providing a magnet position signal, the magnet position signal derived from the difference between the first output signal and the second output signal.

12. Apparatus according to claim 11, wherein the first magnetic sensor means and the second magnetic sensor means are substantially identical, and wherein the first magnetic sensor means is rotated relative to the second magnetic sensor means.

13. Apparatus according to claim 12, wherein the first magnetic sensor means is rotated toward a center magnetic position located between the first magnetic sensor means and the second magnetic sensor means.

14. Apparatus according to claim 13, wherein the second magnetic sensor means is rotated toward the center magnetic position.

15. Apparatus according to claim 11, wherein the first magnetic sensor means includes a first over-travel sensor for detecting when the position of the magnet is at a first over-travel position along the defined path.

16. Apparatus according to claim 15, wherein the first over-travel position is located directly overhead of the first magnetic sensor means.

17. Apparatus according to claim 15, wherein the second magnetic sensor means includes a second over-travel sensor for detecting when the position of the magnet is at a second over-travel position along the defined path.

18. Apparatus according to claim 17, wherein the second over-travel position is located directly overhead of the second magnetic sensor means.

19. Apparatus according to claim 17, wherein the first over-travel sensor includes a first bridge sensor for providing a first over-travel signal and the second over-travel sensor includes a second bridge sensor for providing a second over-travel signal.

20. Apparatus according to claim 19, wherein the first bridge sensor and the second bridge sensor are not rotated toward a center magnetic position.

21. Apparatus according to claim 19, further comprising a second differencing means for providing a compensation signal that is derived from the difference between the first over-travel signal and the second over-travel signal.

22. Apparatus according to claim 21, wherein the first magneto-resistive element, the second magneto-resistive element, the third magneto-resistive element, and the fourth magneto-resistive element collectively provide a distributed proportional sensor, the distributed proportional sensor being powered by a supply voltage.

23. Apparatus according to claim 22, further comprising excitation control means, the excitation control means controlling the supply voltage of the distributed proportional sensor via the compensation signal.

24. Apparatus according to claim 23, further comprising control means having an output, the control means passing the magnet position signal to the output of the control means when the first over-travel sensor and the second overtravel sensor indicate that the position of the magnet is between the first and second over-travel positions, the control means providing a first predetermined voltage when the first over-travel sensor indicates that the position of the magnet is located at a predetermined location relative to the first magnetic sensor means and a second predetermined voltage when the second over-travel sensor indicates that the position of the magnet is located at a predetermined location relative to the second magnetic sensor means.

25. Apparatus for determining the position of a magnet that is movable along a defined path, comprising:

first magnetic sensor means positioned at a first location along the defined path;

second magnetic sensor means positioned at a second location along the defined path, wherein the second location is spaced from the first location;

the first magnetic sensor means including a first magneto-resistive element, a second magneto-resistive element, a third magneto-resistive element and a fourth magneto-resistive element, the first magneto-resistive element, the second magneto-resistive element, the third magneto-resistive element and the fourth magneto-resistive element coupled together in a full bridge configuration for providing a first output signal and a second output signal;

the second magnetic sensor means including a fifth magneto-resistive element, a sixth magneto-resistive element, a seventh magneto-resistive element and an eighth magneto-resistive element, the fifth magneto-resistive element, the sixth magneto-resistive element, the seventh magneto-resistive element and the eighth magneto-resistive element coupled together in a full bridge configuration for providing a third output signal and a fourth output signal;

the first output signal is coupled to the fourth output signal for providing a first sensor output signal, and the second output signal is coupled to the third output signal for providing a second sensor output signal; and differencing means for providing a magnet position signal, the magnet position signal derived from the difference between the first sensor output signal and the second sensor output signal.

26. Apparatus according to claim 25, wherein the first magnetic sensor means and the second magnetic sensor means are substantially identical, and wherein the first magnetic sensor means is rotated relative to the second magnetic sensor means.

27. Apparatus according to claim 26, wherein the first magnetic sensor means is rotated toward a center magnetic position located between the first magnetic sensor means and the second magnetic sensor means.

28. Apparatus according to claim 27, wherein the second magnetic sensor means is rotated toward the center magnetic position.

29. Apparatus according to claim 27, wherein the first magnetic sensor means is provided in a first integrated circuit package, and the second magnetic sensor means is provided in a second integrated circuit package.

30. Apparatus according to claim 25, wherein the first magnetic sensor means includes a first over-travel sensor for detecting when the position of the magnet is at a first over-travel position along the defined path.

31. Apparatus according to claim 30, wherein the first over-travel position is located directly overhead the first magnetic sensor means.

32. Apparatus according to claim 30, wherein the second magnetic sensor means includes a second over-travel sensor for detecting when the position of the magnet is at a second over-travel position along the defined path.

33. Apparatus according to claim 32, wherein the second over-travel position is located directly overhead the second magnetic sensor means.

34. Apparatus according to claim 32, wherein the first over-travel sensor includes a first bridge sensor for providing a first over-travel signal and the second over-travel sensor includes a second bridge sensor for providing a second over-travel signal.

35. Apparatus according to claim 34, further comprising a differencing circuit for providing a compensation signal that is derived from the difference between the first over-travel signal and the second over-travel signal.

36. Apparatus according to claim 35, wherein the first magneto-resistive element, the second magneto-resistive element, the third magneto-resistive element, the fourth magneto-resistive element, the fifth magneto-resistive element, the sixth magneto-resistive element, the seventh magneto-resistive element and the eighth magneto-resistive element collectively provide a distributed proportional sensor, the distributed proportional sensor being powered by an excitation supply voltage.

37. Apparatus according to claim 36, further comprising an excitation control means, the excitation control means controlling the excitation supply voltage of the distributed proportional sensor using the compensation signal.

38. Apparatus according to claim 37, further comprising control means having an output, the control means passing the magnet position signal to the output of the control means when the first over-travel sensor and the second over-travel sensor indicate that the position of the magnet is between the first and second over-travel positions, the control means providing a first predetermined voltage when the first overtravel sensor indicates that the position of the magnet at a predetermined location relative to the first magnetic sensor means and a second predetermined voltage when the second over-travel sensor indicates that the position of the magnet is at a predetermined location relative to the second magnetic sensor means.

39. A method for determining the position of a magnet that is movable along a defined path, the magnet having a first polarity pole and a second polarity pole with no intermediate poles therebetween, the magnet producing a magnetic field, the method comprising the steps of:

sensing the magnetic field of the magnet using a distributed bridge sensor, wherein the distributed bridge sensor senses the magnetic field from at least two locations along the defined path; and providing an output signal that is related to the position of the magnet.

40. A method according to claim 39, wherein the distributed bridge sensor includes two or more magneto-resistive elements connected in a bridge configuration, a first one of the magneto-resistive elements positioned at the first location along the defined path, and a second one of the magneto-resistive elements positioned at the second location along the defined path.

41. A method for determining the position of a magnet that is movable along a defined path, the method comprising the steps of:

sensing the position of the magnet using a distributed bridge sensor;

sensing the position of the magnet using a first non-distributed bridge sensor, the first non-distributed bridge sensor located at a first location along the defined path; and sensing the position of the magnet using a second non-distributed bridge sensor, the second non-distributed bridge sensor located at a second location along the defined path, wherein the first location is spaced from the second location.

42. A method according to claim 41, wherein the distributed bridge sensor includes two or more magneto-resistive elements connected in a bridge configuration, a first one of the magneto-resistive elements positioned at the first location along the defined path, and a second one of the magneto-resistive elements positioned at the second location along the defined path, the distributed bridge sensor being powered by a supply voltage.

43. A method according to claim 42, further comprising the steps of:

passing a first predetermined voltage to an output terminal when the position of the magnet is left of a predetermined left over-travel location;

passing a second predetermined voltage to the output terminal when the position of the magnet is right of a predetermined right over-travel location; and passing the magnet position signal to the output terminal when the position of the magnet is between the predetermined left over-travel location and the predetermined right over-travel location.

44. A method according to claim 43, wherein the first non-distributed bridge sensor detects when the position of the magnet is left of the predetermined left over-travel location, and the second non-distributed bridge sensor detects when the magnet is right of the predetermined right over-travel location.

45. A method according to claim 41, further comprising the steps of:

determining the difference between the position of the magnet sensed by the first non-distributed bridge sensor and the position of the magnet sensed by the second non-distributed bridge sensor, thereby resulting in a measured difference value;

comparing the measured difference value to a predetermined compensation value; and changing the supply voltage of the distributed bridge sensor until the measured difference value substantially equals the predetermined compensation value.

* * * * *